No. 622,093. Patented Mar. 28, 1899.
E. C. WELCH & A. F. DICKEY.
CULTIVATOR ATTACHMENT.
(Application filed Oct. 29, 1898.)
(No Model.) 2 Sheets—Sheet 1.

Witnesses
Lindsay deB. Little

Inventors
E. C. Welch
A. F. Dickey
By J. M. Nesbit
Atty.

No. 622,093. Patented Mar. 28, 1899.
E. C. WELCH & A. F. DICKEY.
CULTIVATOR ATTACHMENT.
(Application filed Oct. 29, 1898.)
(No Model.) 2 Sheets—Sheet 2.

Witnesses
Lindsay deB. Little

Inventors
E. C. Welch,
A. F. Dickey,
By J. M. Nesbit
atty.

THE NORRIS PETERS CO., PHOTO-LITHO., WASHINGTON, D. C.

UNITED STATES PATENT OFFICE.

EVERETT C. WELCH AND AARON F. DICKEY, OF FRIEDENS, PENNSYLVANIA, ASSIGNORS OF ONE-HALF TO O. P. SHAVER AND HERMAN STAHL, OF SAME PLACE.

CULTIVATOR ATTACHMENT.

SPECIFICATION forming part of Letters Patent No. 622,093, dated March 28, 1899.

Application filed October 29, 1898. Serial No. 694,884. (No model.)

*To all whom it may concern:*

Be it known that we, EVERETT C. WELCH and AARON F. DICKEY, citizens of the United States, residing at Friedens, in the county of Somerset and State of Pennsylvania, have invented new and useful Improvements in Cultivator Attachments, of which the following is a specification.

This invention relates to weeding attachments for cultivators; and the primary object thereof is to provide an attachment adapted for ready connection to and disconnection from ordinary forms of cultivators for working directly on rows while the cultivator is performing its usual function between the rows. The attachment being capable of use on cultivators of various patterns and sizes, it is only necessary for the farmer to provide the attachments, using his cultivators with or without them, as the work may require.

The invention consists in the novel features of construction and in the combination and arrangement of parts hereinafter fully described and claimed, and illustrated by the accompanying drawings, in which—

Figure 1:
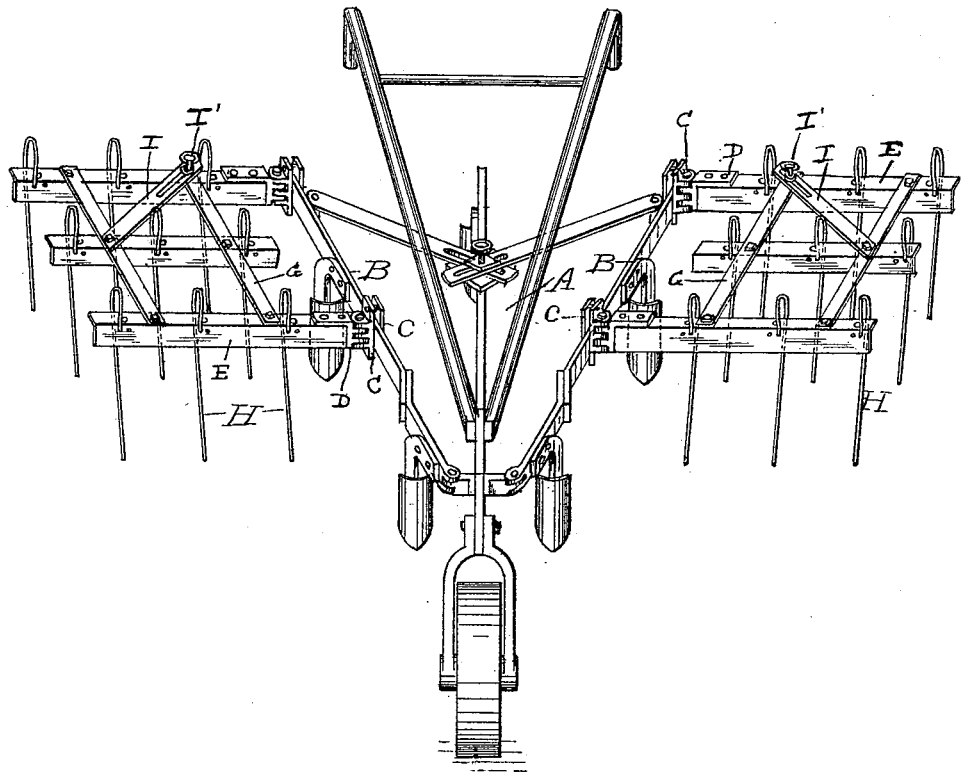
Figure 6:
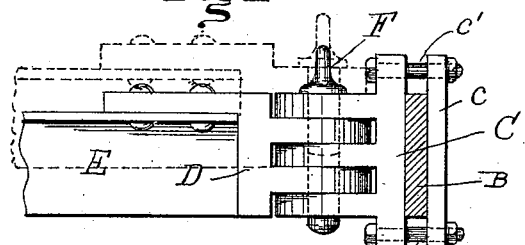
Figure 7:
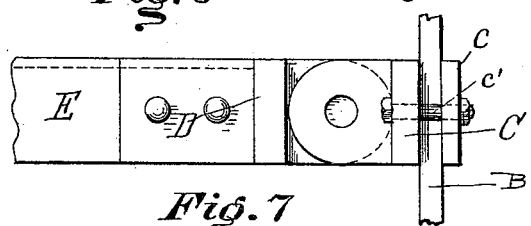
Figure 2:
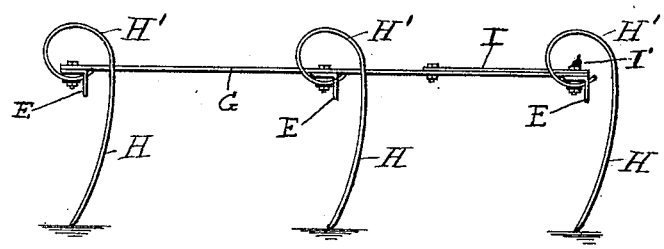
Figure 3:
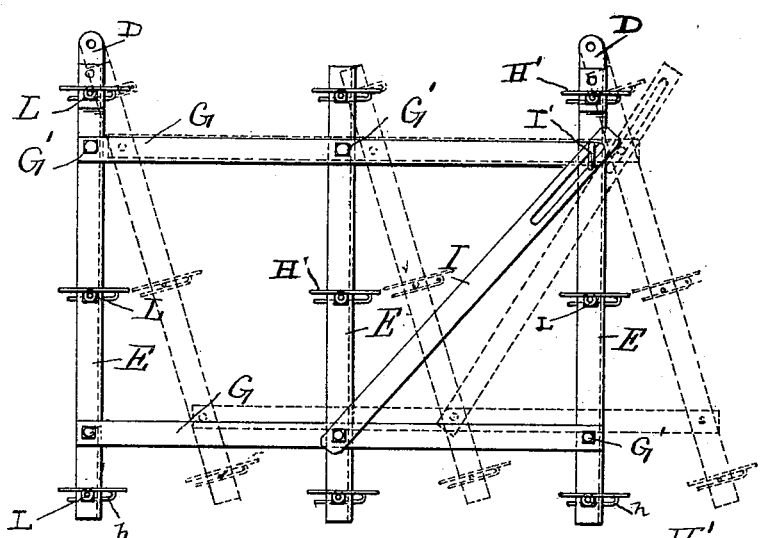
Figure 5:
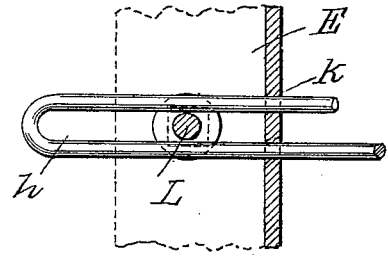
Figure 4:
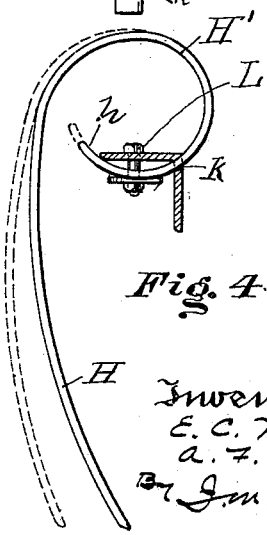

Figure 1 is a perspective view of a cultivator provided with our improved attachment. Fig. 2 is a side view of the attachment. Fig. 3 is a plan view of the same. Figs. 4 and 5 are detail views of one of the tines. Figs. 6 and 7 are similar views of the attachment-connecting clevises.

A designates a cultivator, and secured to the outside bars B thereof are clevises C, clamped by plates $c$ and bolts $c'$. These clevises receive couplings D, secured to the extremities of attachment-bars E, and the clevises and couplings are united in interlocking position by slip-pins F. The positions of the attachments vertically with respect to the cultivator may be varied according to the adjustment in which the clevises and couplings are interlocked, as shown in dotted and solid lines in Fig. 6. These parts also form perfect hinges for swinging the attachments forward and backward in effecting an adjustment thereof presently to be described. The clevises are designed to remain permanently on the cultivator-bars, as they do not interfere with the ordinary work of that implement and are in constant readiness to receive the weeding attachments.

The angle-bars E of each attachment are loosely connected by straps G, a single bolt G' uniting the parts at each intersection, so that the attachments may swing either backward or forward on the clevis-hinges in lazy-tong style to bring tines H in desired relative arrangement, and when adjusted as desired each attachment is made rigid by pivoted strap I, slotted longitudinally and working in conjunction with clamping-bolt I', as will be understood.

The tines H are formed, preferably, of heavy steel spring-wire or slender bars having circular cross-section, the upper end of each tine being curved to form gooseneck H', while the extremity is turned backward on itself to constitute loop $h$. The lower portion of the tine has a gradual forward curvature. For securing the tines to bars H the vertical sides of the latter are formed at proper intervals with two apertures K to pass the body portions of the tines and also the extremities of loops $h$, thus holding the tines against rotation in direction transverse the implement, while bolts L, extending through the horizontal sides of the bars and loops $h$, hold the tines fixed to the bars without possibility of rotation in direction longitudinal of the implement. By this means also the forward pitch of the curved tines may be increased or diminished, as they turn freely through bars H when the hold of bolts L is relaxed. This means of holding the tines is exceptionally strong and durable, as the holding-points—to wit, apertures K and bolts L—are sufficiently separated to distribute the strain and both engage the tines where they are looped, and hence of double strength.

In operation the cultivator is drawn between the rows in the usual manner and performs its ordinary function. In addition the laterally-extending attachments work directly on the rows, loosening the ground and removing the weeds. This is done without injury to the growing plants, owing largely to the slender nature of the tines and to the fact that they are circular in cross-section. The vertical adjustment of which the attachments are capable enables the operator to regulate the depth of the tines to the conditions attending the particular work in hand, some crops permitting or requiring deeper working than others and the same crop often requiring deeper agitation at one stage of its growth than at another. In like manner changes in the grouping of the tines are advantageous, according as the conditions of the crop and ground vary, and this is provided for by the lazy-tong movement of the weeding-sections. Thus it will be seen that all the various conditions attending the great diversity of cultivated crops are provided for, adapting the implement for practically universal use. As each row is agitated twice, any clogging or bending of plants occurring at the first pass is more than likely to be remedied by the second pass, which has opposite direction.

The described row-weeding attachments are adapted for use in connection with a great variety of cultivators, the one here shown being merely for the purpose of illustration. The attachments may be quickly applied to the cultivator and instantly removed, leaving the same free and unimpaired for its usual and ordinary work. If for any reason it should be desired to use the agitating attachments separate from the cultivator, it will be understood that they may be mounted on any convenient form of carrier without departing from the spirit or scope of the invention.

We are aware that it has been proposed heretofore to construct cultivating implements with permanent and substantially integral row-weeding elements. Our invention differs therefrom in that our attachments are separate and distinct devices, capable of attachment to any form of cultivator-frame, and as readily detachable therefrom when the cultivator alone is required. A further difference and advantage resides in the uniform vertical adjustment of our attachments their entire width and holding same rigid with the cultivator, thus affording the operator perfect control thereof through the cultivator-handles and enabling him to regulate the implement to the work in hand.

Having thus fully described our invention, what we claim as new, and desire to secure by Letters Patent, is—

1. In a weeding attachment for cultivators, the combination of a frame composed of parallel bars united pivotally by transverse straps, means for holding the bars and straps in desired relative adjustment, tines depending from the frame, and horizontally-swinging vertically-rigid hinges for uniting the frame to a cultivator, substantially as shown and described.

2. In a weeding attachment for cultivators, the combination of the parallel angle-bars E, straps G extending transversely over said bars and pivotally connected thereto, means for holding the bars and straps rigid in desired adjustment, depending tines having bent upper ends extending through apertures in the vertical sides of angle-bars E, tine-clamping bolts extending through the bars and coöperating with the apertured sides of the bars for holding the tines in position, and means for securing the angle-bars to a cultivator, substantially as shown and described.

3. The combination of a cultivator provided with side bars B, hinge-sections C secured to the bars by clamping-plates c and bolts c', laterally-projecting bars E having hinge-sections D at their inner ends which unite with hinge-sections C by pins F, a pivotal connection between the bars and means for holding the same rigid, and tines depending from the bars, substantially as shown and described.

4. In an implement of the character described, the combination with a cross-bar, of a tine formed with a gooseneck at its upper end for embracing the bar, the extremity of the neck being turned back upon itself to constitute an elongated loop, and a securing-bolt extending through the bar and the tine-loop, whereby the tine may be given the desired inclination and there secured, substantially as specified.

5. In an implement of the character described, the combination with an angle-bar having two apertures in its vertical side, of a tine adapted to extend through one of the apertures, the extremity of the tine being turned backward to form an elongated loop with the said extremity extending through the other bar-aperture, and a bolt extending vertically through the loop and the horizontal side of the bar for securing the tine in desired adjustment, substantially as shown and described.

In testimony whereof we have hereunto set our hands in presence of two subscribing witnesses.

EVERETT C. WELCH.
   AARON F. DICKEY.

Witnesses:
 CHARLES W. WALKER,
 FRED W. BIESECKER.